US012565356B2

(12) United States Patent
Guy et al.

(10) Patent No.: US 12,565,356 B2

(45) Date of Patent: Mar. 3, 2026

(54) SYSTEM FOR CONTAINER CONTENT IDENTIFICATION

(71) Applicant: GROVE COLLABORATIVE, INC., San Francisco, CA (US)

(72) Inventors: Nichole Guy, San Francisco, CA (US); Jon Silverman, Mill Valley, CA (US)

( * ) Notice: Subject to any disclaimer, the term of this patent is extended or adjusted under 35 U.S.C. 154(b) by 26 days.

(21) Appl. No.: 18/241,484

(22) Filed: Sep. 1, 2023

(65) Prior Publication Data

US 2024/0076104 A1 Mar. 7, 2024

Related U.S. Application Data

(60) Provisional application No. 63/403,123, filed on Sep. 1, 2022.

(51) Int. Cl.

| | |
|---|---|
| ***G09F 3/00*** | (2006.01) |
| ***B65D 25/20*** | (2006.01) |
| ***G09F 3/02*** | (2006.01) |
| ***G09F 3/04*** | (2006.01) |

(52) U.S. Cl.

CPC ............. *B65D 25/205* (2013.01); *G09F 3/02* (2013.01); *G09F 3/04* (2013.01); *B65D 2203/02* (2013.01); *G09F 2003/0251* (2013.01); *G09F 2003/0273* (2013.01)

(58) Field of Classification Search

CPC .............. B65D 2203/02; B65D 25/205; G06K 7/10861; G09F 3/02; G09F 3/04; G09F 2003/0251; G09F 2003/0273

USPC ...................... 40/310; 206/534, 459.1, 459.5

See application file for complete search history.

(56) References Cited

U.S. PATENT DOCUMENTS

| | | | | |
|---|---|---|---|---|
| 566,761 A * | 9/1896 | Hosmer | G09F 3/04 | 40/310 |
| 4,877,119 A * | 10/1989 | Hosking | G01F 19/00 | D7/509 |
| 6,212,803 B1 * | 4/2001 | Key | B65D 23/0878 | 40/506 |
| 6,672,621 B1 * | 1/2004 | Moss | B42D 17/005 | 206/472 |

* cited by examiner

*Primary Examiner* — King M Chu

(74) *Attorney, Agent, or Firm* — Dykema Gossett PLLC

(57) ABSTRACT

Apparatus, methods, devices for container content identification is described herein. In some variations, an apparatus may include a container, comprising a circumferentially extending groove. In some embodiments, the apparatus can include a labeling ring, wherein the labeling ring is configured to be inserted into the circumferentially extending groove. In some embodiments, the apparatus can include a cover disposed about a portion of the container including the circumferentially extending groove and the labeling ring.

14 Claims, 8 Drawing Sheets

SYSTEM FOR CONTAINER CONTENT IDENTIFICATION

CROSS-REFERENCE TO RELATED APPLICATIONS

This application claims the benefit of U.S. provisional application No. 63/403,123, filed 1 Sep. 2022 (the '123 application), which is related to U.S. application Ser. No. 29/851,933, filed 1 Sep. 2022 (the '933 application), now pending. Both applications are hereby incorporated by reference in their entirety for all purposes as though fully set forth herein.

TECHNICAL FIELD

This invention relates generally to the field of containers, such as for container content identification.

BACKGROUND

One cost-effective and environment-friendly approach of storing different types of content is to re-use and/or re-purpose a container. For instance, containers may be used for a first content type at a first point in time and may be then re-purposed and used for another content type at a different point in time. However, this may make it challenging for a user to remember what type of content may be in the container at a specific time.

In order to identify different contents in a container, traditional methods employ methods such as using label stickers, laminated tags and/or the like. However, these methods often prove ineffective. For example, a user may be deterred from storing a content type in the container that does not correspond to the label on the container. If the user does proceed with storing a content type that does not correspond to the label, then this may lead to confusion. Additionally, if the container is labeled with labels that include adhesives, there may be a likelihood that the adhesives are weak, consequently making the labels fall off.

Therefore, there is an unmet need to provide new and improved methods of enabling identification of content in a container.

SUMMARY

Various embodiments of the present disclosure can include an apparatus comprising a container that includes a circumferentially extending groove. A labeling ring can be configured to be inserted into the circumferentially extending groove. A cover can be disposed about a portion of the container including the circumferentially extending groove and the labeling ring.

Various embodiments of the present disclosure include a container, comprising a longitudinal axis about which a wall extends. A groove can be formed in an exterior face of the wall. An alignment indicator can be formed on the exterior face of the wall, adjacent to the groove.

DETAILED DESCRIPTION

Non-limiting examples of various aspects and variations of the invention are described herein and illustrated in the accompanying drawings.

Some containers may be re-purposed to store different types of content. For instance, a container may be re-purposed to store different types of cleaning solutions (e.g., cleaning solutions for shower, tub and tile, glass, etc.). In a similar manner, a mason jar may be re-purposed to store different types of spreads (e.g., jams, jellies, marmalades, etc.). However, labeling such containers to indicate the type of content in the container may be challenging.

Traditional methods of labeling contents in a container include using tags, label stickers, etc. However, this can be an ineffective way of labeling contents. For instance, if the container is already labeled with a first label, a user may be deterred to place content types that do not correspond to the first label into the container. Moreover, if the user does proceed with placing a second content type in the container, the labeling (e.g., first label that does not correspond to the second content type) on the container may cause confusion.

In some instances, when a first content type in the container is switched for a second content type, the container may need to be re-labelled to indicate the second content type. However, traditional methods can make this a cumbersome process. For example, switching a first label (e.g., a first label sticker) for a second label (e.g., a second label sticker) may require removing the first label from the container. If adhesives are used to attach the labels to the container, removing the first label may leave behind a residue (e.g., portions of the first label, portions of the adhesive, etc.). Such residue may be difficult to remove and may end up damaging the container. Furthermore, if the second label is attached to the container in the exact same place as the first label, the residue from the first label may interfere with the second label making it difficult to read the second label. Additionally, the residue from the labels may make recycling the container challenging. Therefore, traditional methods of labeling contents in a container may prove to be ineffective.

Methods, devices, and system disclosed herein enable content identification for a container in a simple and easy-to-use manner. In addition to enabling content identification, the technology described herein may protect the container and provide heat insulation and/or better grip.

Figure 1A:
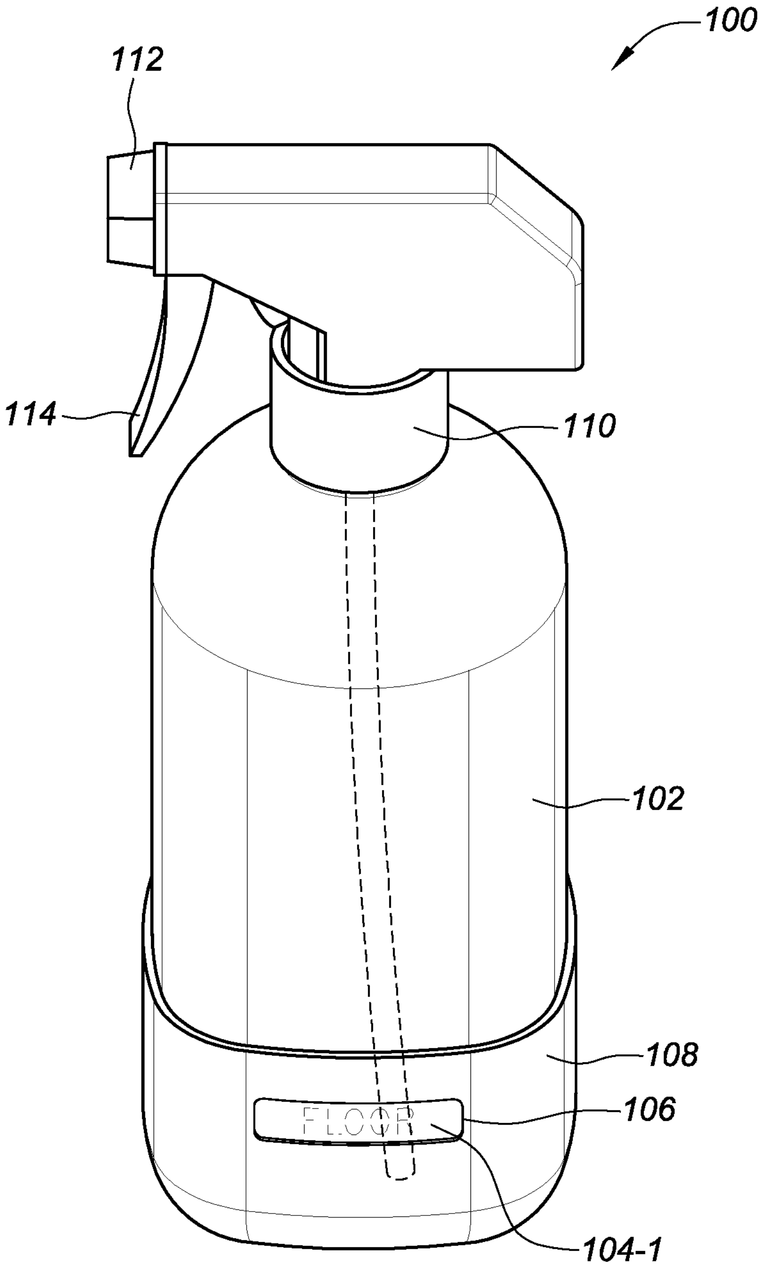
FIG. 1A depicts a system for container content identification, in accordance with embodiments of the present disclosure.

FIG. 1A illustrates a system 100 for container content identification, in accordance with embodiments of the present disclosure. The system 100 may include a container 102. In some embodiments, the system can be configured such that a label 104 can selectively be displayed to identify the contents of the container 102. In an example, a label 104 can be displayed via a labeling region 106 defined in a cover 108, such that the contents of the container 102 can be displayed, as further discussed herein.

In some embodiments, the container 102 may be any suitable container for storing one or more contents. In some variations, the container 102 may include any suitable shape with a substantially curved portion. For example, the container 102 may include a substantially cylindrical portion. Alternatively, the container 102 may include a rectangular shaped portion. For example, a bottom portion of the container 102 may be substantially square shaped, substantially rectangular shaped, etc. The container may have a radially-symmetrical cross-section or other symmetrical cross-section (e.g., bi-lateral symmetry, tri-lateral symmetry, quadrilateral symmetry, other symmetry along any suitable number of axes such as 5, 6, 7, 8 or more, etc.). Furthermore, in some variations the container 102 may have a varied cross-sectional shape. For example, the container 102 may have a cross-sectional shape that varies along a longitudinal axis of the container (e.g., tapered profile, such as a cone or pyramid, or a portion thereof such as frustoconical). In some variations, the container 102 may be rigid. Alternatively, the container 102 may be semi-rigid. For instance, the container 102 may be a flexible container configured to be compressed and/or stretched and/or the container 102 may be a squeezable container. The container 102 may comprise any suitable material such as glass, metal, plastic, and/or the like.

The container 102 may include a cap 110 or any other closure device configured to close the container 102. The cap 110 may be attached to the container 102 in any suitable manner. For example, the cap 110 may be attached to the container 102 using threads, snap-fit assembly, one or more hinges, a combination thereof, and/or the like. In some variations, the cap 110 may be or include a dispenser. The dispenser may in some instances include a nozzle 112 and/or a trigger 114 (e.g., handle) to actuate the nozzle 112. In other variations, the cap 110 may include a pump dispenser with a dispensing tip (e.g., needle tip). In some variations, the dispenser may include a dispenser cover that is at least partially removed or disengaged to access the dispenser (e.g., threaded, snap fit, hinged). Although FIG. 1 is depicted as having a cap 110 that includes a dispenser, some embodiments can include a cap 110 without a dispenser.

In some variations, the cap 110, nozzle 112, and trigger 114 may comprise a same material (e.g., plastic, metal). Alternatively, the material of the cap 110, nozzle 112, and/or trigger 114 may be different from one other. In some variations, the nozzle 112 may be color-coded to indicate a type of content in the container 102. For example, the nozzle 112 may include a first color to indicate a first content. When the container 102 is re-purposed to store a second content, the nozzle 112 may be switched to another nozzle having a second color indicating the second content. In a similar manner, additionally or alternatively, the trigger 114 may be color-coded to indicate a type of content in the container 102. In some variations, the entire cap 110 (as opposed to portions of the cap 110 such as nozzle 112 and/or trigger 114) may be color-coded to indicate a type of content in the container 102. In some variations, the color of the nozzle 112 may match that of the cover 108. In such variations, the nozzle 112 and the cover 108 may be collectively color-coded to indicate a type of content in the container. In a similar manner, the color of the trigger 114 may match that of the cover 108. Additionally or alternatively, the color of the cap 110 may match that of the cover 108.

Figure 1B:
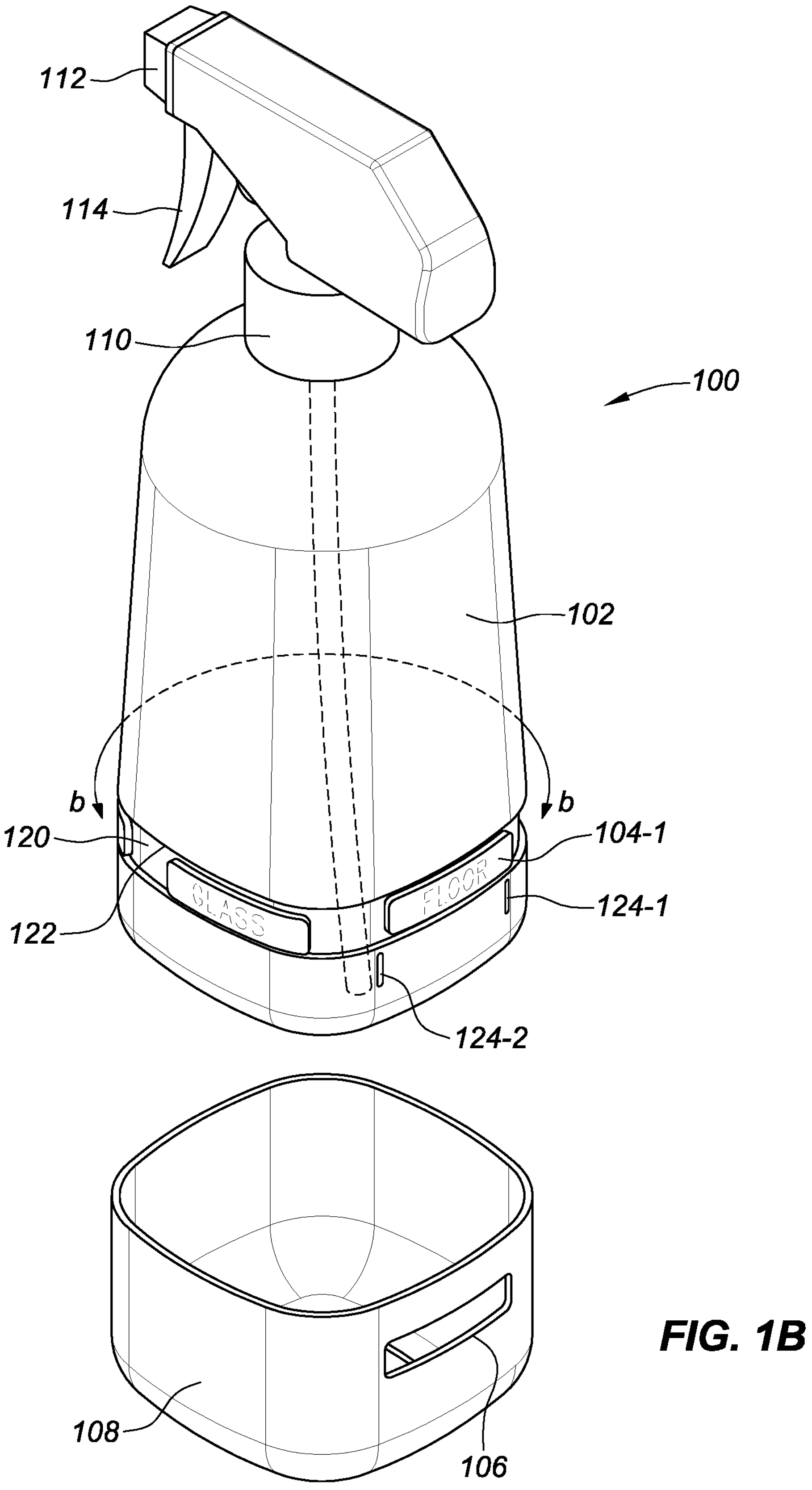
FIG. 1B depicts an exploded view of the system for container content identification depicted in FIG. 1A, in accordance with embodiments of the present disclosure.

FIG. 1B illustrates an exploded view of the system 100 for container content identification depicted in FIG. 1A, in accordance with embodiments of the present disclosure. As depicted in FIG. 1B, the cover 108 has been removed from the container 102, exposing a labeling ring 120. In some embodiments, the label 104-1 can be disposed on the labeling ring 120, as depicted. As further depicted in FIG. 1B, the container can define a circumferentially extending groove 122. In some embodiments, the circumferentially extending groove 122 can extend about a longitudinal axis aa defined by the container 102. For example, the circumferentially extending groove 122 can be defined in an exterior surface and can extend inward from the exterior surface toward the longitudinal axis aa. In some embodiments, the labeling ring 120 can be disposed in the circumferentially extending groove 122 and can be configured to revolve about the longitudinal axis aa in a direction of line bb.

In some embodiments, the labeling ring 120 can include a plurality of labels 104, only one of which can be seen in FIG. 1B. The labels 104 may be disposed on, attached to, and/or integrated with the labeling ring 120. The labels 104, collectively referred to as labels 104, may be any suitable character and/or a combination of suitable characters representing a respective content type. For example, each label 104 may be a text including one or more alphabets, numbers, symbols, special characters, emoticons, a combination thereof, and/or the like indicating a content type. Additionally or alternatively, each label 104 may be a graphic symbol (e.g., an icon) representing a content type. In some embodiments, the labels 104-1 can be disposed on the labeling ring in a number of ways. For example, the labels 104-1 can be printed on the labeling ring, embossed in a surface of the labeling ring 120, and/or can be raised with respect to the surface of the labeling ring 120. In some embodiments, the labels 104 may be decals that are attached to an outer surface and/or an inner surface of the labeling ring 120. In some embodiments, a portion of the labeling ring 120 can include a blank space, which can be customized by a user. For example, a user may place a custom label in the blank space based on the content type included in the container 102 (e.g., by writing directly in the blank space on the container, attaching a separate label to the blank space on the container, etc.).

As shown in FIG. 1B, the labels 104 may be disposed on, attached to, and/or integrated with the labeling ring 120, perpendicular to a longitudinal axis aa. In some variations, each label 104 may be at equal distance from each other. Alternatively, at least some labels may be at a different distance from their adjacent labels compared to other labels on the labeling ring 120. In some variations, the labels 104 may be disposed along the entire circumference of the labeling ring 120. Alternatively, all of the labels 104 may be disposed along a portion of the circumference of the labeling ring 120. For example, one half of the circumference of the labeling ring 120 may include the labels 104 while the other half of the circumference of the labeling ring 120 may not include any label 104.

As depicted in FIG. 1B, the cover 108 has been removed from the base of the container 102. As further discussed herein, the cover 108 can include a labeling region 106 through which one of the plurality of labels can be displayed. For example, the cover 108 partially covering the container 102 may include a labeling region 106 (e.g., opening) to expose one or more labels on the labeling ring 120. In some embodiments, the labeling region 106 can include an opening that allows for the label 104 to be exposed. In some embodiments, the labeling region 106 can include a window disposed in the cover 108, allowing for viewing of the label 104. For example, the window can be formed from a transparent material, allowing for the label 104 to be seen by a user. In some embodiments, the labeling region 106 can be left open and may not include a covering disposed over the labeling region.

In some embodiments, the cover can be disposed about a portion of the container 102, including the circumferentially extending groove. To indicate the contents of the container 102, the labeling ring 120 can be rotated about the container 102 and the circumferentially extending groove 122, such that a particular one of the labels (e.g., label 104-1) is positioned in a particular configuration on the container 102, such as that depicted in FIG. 1B. For example, the labeling ring 120 can be rotated, such that the "FLOOR" label 104-1 is positioned as shown. In some embodiments, the labeling ring 120 can be rotated, such that a particular one of the labels 104 is aligned with one or more alignment indicators 124-1, 124-2. In some embodiments, the container 102 can include the one or more alignment indicators to provide a reference to a user, such that the labeling ring 120 can be rotated to a proper position to allow for the particular one of the labels 104 to be displayed in the labeling region 106 of the cover 108. For example, the labeling ring 120 can be positioned, such that the particular one of the labels 104 is positioned between the alignment indicators 124-1, 124-2. Upon positioning of the labeling ring 120, such that the particular one of the labels 104 is positioned between the alignment indicators 124-1, 124-2, the cover 108 can be positioned over the labeling ring 120 and the container 102, such that the particular one of the labels 104 is positioned within the labeling region 106, as depicted in FIG. 1.

Figure 1C:
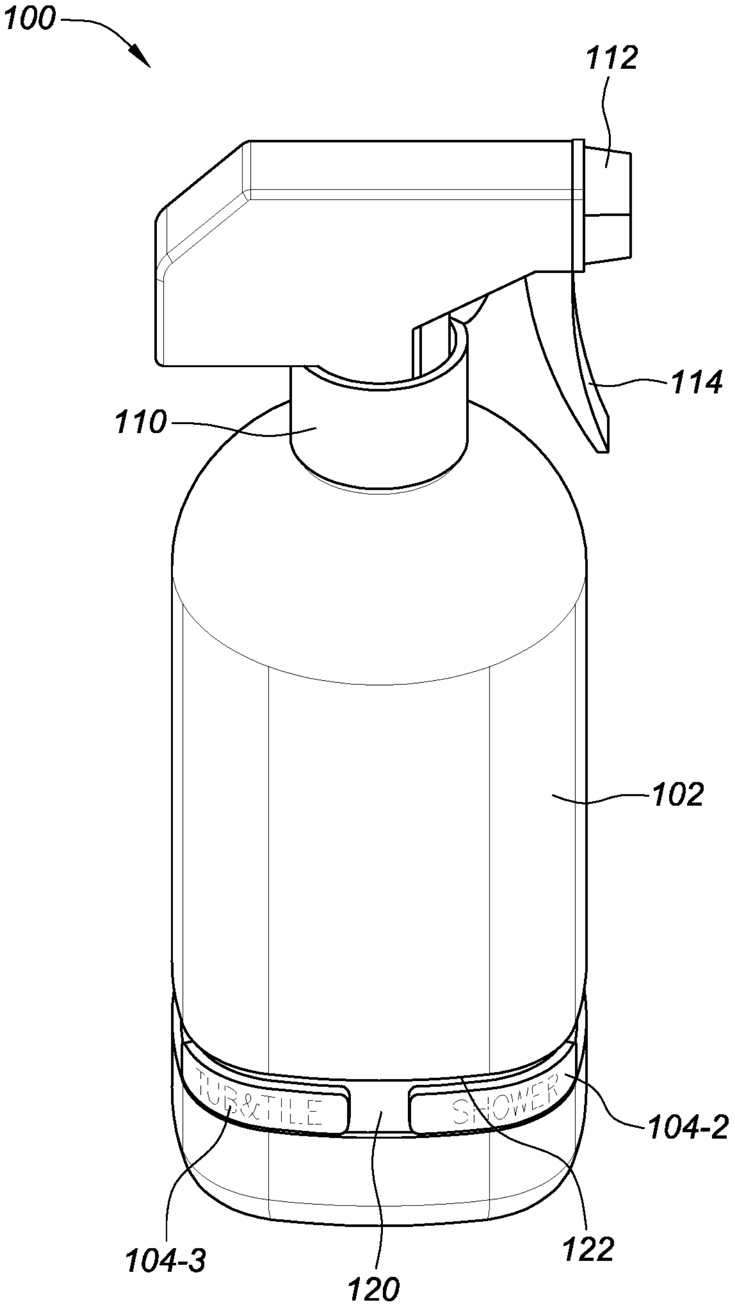
FIG. 1C depicts a side view of the container opposite from that depicted in FIG. 1B, in accordance with embodiments of the present disclosure.

FIG. 1C is a side view of the container 102 opposite from that depicted in FIG. 1B, in accordance with embodiments of the present disclosure. As further depicted, the labeling ring 120 is disposed within the circumferentially extending groove 122. In some embodiments, additional labels 104-2, 104-3 can be disposed on the labeling ring 120. For example, as depicted, a label 104-2 for "SHOWER" can be disposed on the labeling ring 120 and a label 104-3 for "TUB+TILE" can be disposed adjacent to the label 104-2, although the labels may include any number of different types of content labels. A particular one of the labels 104-2, 104-3, depicted in FIG. 1C can be displayed within the labeling region 106, depending on the positioning of the labeling ring 120 and the cover 108.

In some embodiments, the labeling ring 120 can be formed from an elastic material, which allows the labeling ring 120 to be stretched over an outer diameter of the container 102 and be disposed in the circumferentially extending groove 122, as depicted and discussed in relation to FIG. 1B. In some embodiments, a naturally biased diameter of the labeling ring 120 can be less than that of the outer diameter of the container 102 and less than that of the circumferentially extending groove 122, such that the labeling ring 120 makes contact with a base wall of the circumferentially extending groove (e.g., a wall disposed most radially inward). In some embodiments, the labeling ring 120 can be configured to be in a stretched state when disposed in the circumferentially extending groove 122 in order to prevent rotation and/or movement of the labeling ring 120.

Figure 1D:
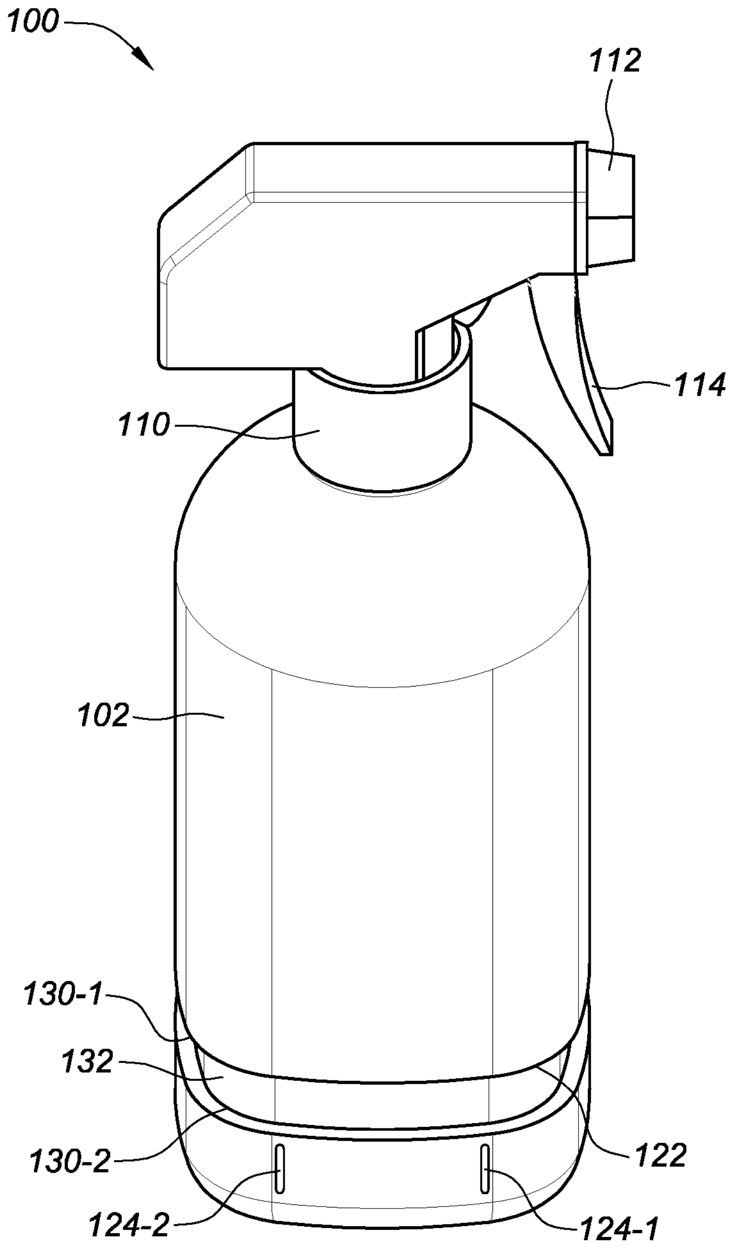
FIG. 1D depicts a side view of the container depicted in FIG. 1C, with the labeling ring removed, in accordance with embodiments of the present disclosure.

FIG. 1D is a side view of the container depicted in FIG. 1C, with the labeling ring 120 removed, in accordance with embodiments of the present disclosure. As depicted, in some embodiments, a circumferentially extending groove 122 (e.g., labeling groove) can be defined in an exterior face of a side wall of the container 102. For example, the labeling groove can be defined by a first and second wall 130-1, 130-2 that extend inward from the exterior face of the side wall of the container 102, towards the longitudinal axis. As depicted, a base wall 132 can extend between the pair of side walls 130-1, 130-2, parallel with the longitudinal axis. In some embodiments, the base wall 132 can be convex or concave.

Figure 1E:
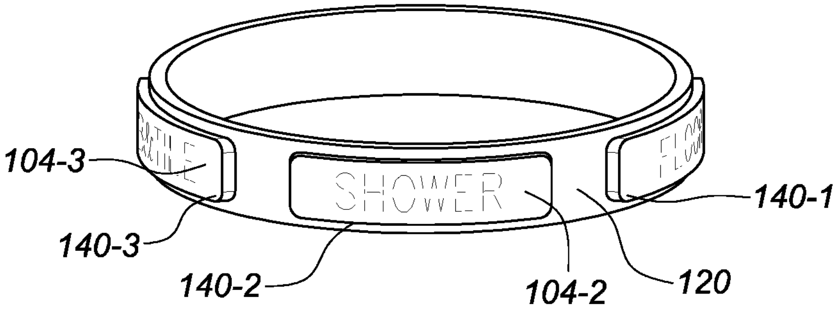
FIG. 1E depicts an isometric side and top view of the labeling ring, in accordance with embodiments of the present disclosure.

FIG. 1E depicts an isometric side and top view of the labeling ring 120, in accordance with embodiments of the present disclosure. In some embodiments, the labeling ring 120 can include a plurality of labels disposed thereon. The plurality of labels can identify the contents of a container 102 on which the labeling ring 120 is disposed. As depicted in FIG. 1E, the labeling ring 120 includes a label for "SHOWER," which can be used to identify cleaning agent stored in the container 102, for use when cleaning a shower. Additional labels are disposed on the labeling ring 120, which are partially hidden from view.

In some embodiments, the labeling ring 120 can include a plurality of raised areas 140-1, 140-2 . . . , 140-5 on which the labels are disposed. In some embodiments, the raised areas 140-1, 140-2 . . . , 140-5 can be configured to fit within a labeling region 106, as depicted in FIG. 1A. In some embodiments, the labeling region 106 can include a cutout in a sidewall of the cover 108 that is approximately the same size as the raised areas 140-1, 140-2 . . . , 140-5 of the labeling ring 120. In some embodiments, an externally facing surface of the raised areas can be even with an externally facing surface of the cover 108, as depicted in FIG. 1. In some embodiments, the externally facing surface of the raised areas 140-1, 140-2 . . . , 140-5 can be recessed from the externally facing surface of the cover 108. In some embodiments, the externally facing surface of the raised areas 140-1, 140-2 . . . , 140-5 can protrude from the externally facing surface of the cover 108. The variation in the externally facing surfaces of the raised areas 140-1, 140-2 . . . , 140-5 and the cover 108 can create a different user experience, in some embodiments.

In some embodiments, the cover 108 can be formed from an elastic material. Accordingly, the cover 108 can be stretched and positioned over the raised areas 140 that are not positioned within the labeling region 106. Furthermore, the cover 108 can be stretched over the bottom portion of the container 102 and over the labeling ring 120 to securely hold the cover 108 in position.

The labeling ring 120 may be rotated around the longitudinal axis aa to expose different labels 104 disposed on the raised areas 140, through the labeling region 106. For example, the labeling ring 120 may be rotated around the longitudinal axis aa to align a particular label 104 with the alignment indicators 124-1, 124-2. The cover 108 can then be inserted over the bottom portion of the container 102 and the labeling ring, such that the labeling region is aligned with the particular selected label. Alternatively, the labels 104 may be parallel to the longitudinal axis but at different heights on the labeling ring 120. In such variations, the cover 108 may be configured to be slidable (or extendable) and/or rotatable along the longitudinal axis in order to expose a selected label having a certain longitudinal and/or circumferential position on the container.

Figure 1F:
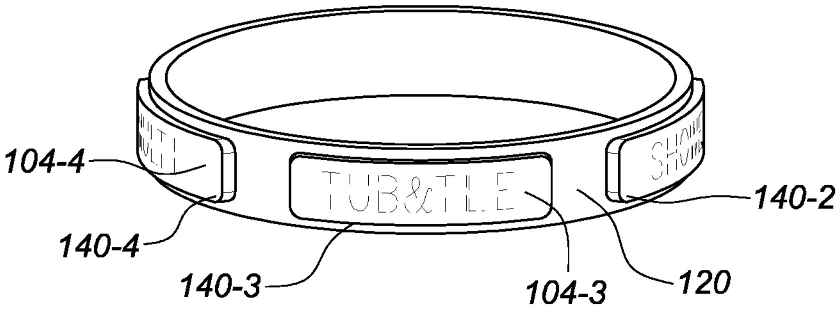
FIG. 1F depicts an alternate isometric side and top view of the labeling ring depicted in FIG. 1E, in accordance with embodiments of the present disclosure.

FIG. 1F depicts an alternate isometric side and top view of the labeling ring 120 with raised areas 140-2, 140-3, 140-4 and labels 104-2, 104-3, 104-4, in accordance with embodiments of the present disclosure. As depicted, the raised areas 140-2, 140-3, 140-4 extend radially outward from the labeling ring 120 and the labels 104-2, 104-3, 104-4 are disposed on the raised areas 140-2, 140-3, 140-4. In some embodiments, the raised areas 140-2, 140-3, 140-4 can have radially extending profile that is square, rectangle, oblong, circular, triangular, among other types of shapes. As depicted the raised areas 140-2, 140-3, 140-4 can have rectangular profiles with rounded corners. In some embodiments, the radially extending profile of the raised areas 140-2, 140-3, 140-4 can match the shape of the labeling region 106, through which the raised areas 140-2, 140-3, 140-4 extend.

Figure 1G:
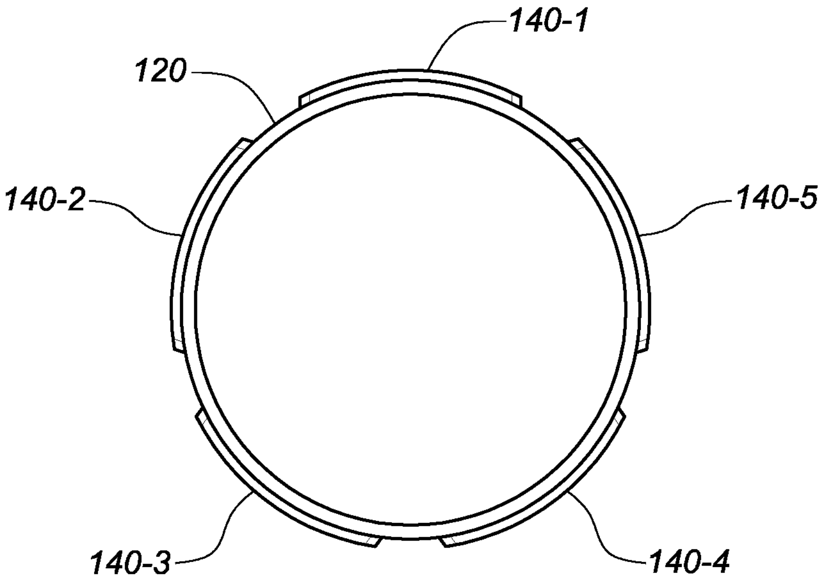
FIG. 1G further depicts a top view of the labeling ring depicted in FIGS. 1E and 1F, in accordance with embodiments of the present disclosure.

FIG. 1G further depicts a top view of the labeling ring 120 depicted in FIGS. 1E and 1F with raised areas 140-1, 140-2 . . . , 140-5 radially extending from the labeling ring 120, in accordance with embodiments of the present disclosure. In some embodiments, one of the raised areas 140-1, 140-2 . . . , 140-5 can be disposed within the labeling region 106. For example, one of the raised areas 140-1, 140-2 . . . , 140-5 can be aligned with the labeling region 106, such that the one of the raised areas 140-1, 140-2 . . . , 140-5 extends through the labeling region 106. In some embodiments, the other ones of the raised areas 140-1, 140-2 . . . , 140-5 and associated labels 104 can be hidden underneath the cover 108. For example, the cover 108 can be disposed over the raised areas 140-1, 140-2 . . . , 140-5 and the associated labels 104.

Figure 1H:
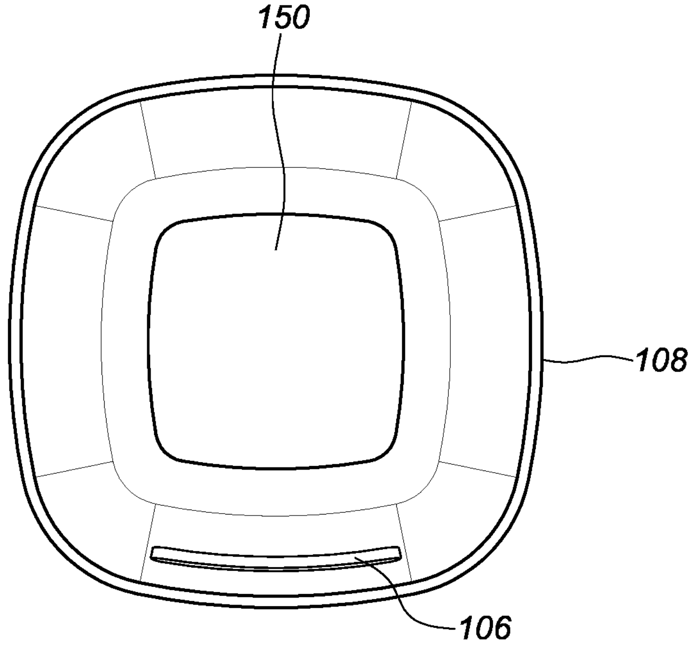
FIG. 1H depicts a top view of the cover, in accordance with embodiments of the present disclosure.

FIG. 1H depicts a top view of the cover 108, in accordance with embodiments of the present disclosure. As depicted, the cover 108 can include a labeling region 106 defined in a sidewall of the cover 108, through which one of the labels 104 can be displayed. In some embodiments, a radial height of the raised areas 140-1, 140-2 . . . , 140-5 can match a wall thickness of the cover 108. In some embodiments, the radial height of the raised areas 140-1, 140-2 . . . , 140-5 can be less than or greater than the wall thickness of the cover 108. As depicted, a base of the cover 108 can define a cutout 150. In some embodiments, the cutout 150 can allow for trapped air between the cover 108 and the base of the container to be released through the cutout 150. For example, when the cover 108 is inserted over the base of the container 102, air can be trapped between an interior of the cover 108 and the container 102. The cutout 150 can allow for the trapped air to escape.

Although FIG. 1B depicts the labels 104 as perpendicular to the longitudinal axis aa, the labels 104 may have any suitable orientation relative to the longitudinal axis aa. For example, in some embodiments, the labels 104 can be disposed parallel with the longitudinal axis aa, or at an angle with respect to the longitudinal axis aa. The labels 104 may be at equal distance or at different distance from their adjacent labels. In such variations, the labeling region 106 defined in the cover 108 may be oriented perpendicular, parallel, or at an angle with respect to the longitudinal axis aa, and may be rotated around the longitudinal axis aa to expose different labels 104 on the container 102.

Cover

Cover 108 may surround at least a portion of the container 102 and include at least one labeling region that matches or corresponds to the orientation of at least one label 104 on the container. For example, if the labels 104 are oriented parallel to the longitudinal axis aa, the labeling region may also be oriented parallel to the longitudinal axis aa. Alternatively, if the labels 104 are oriented perpendicular to the longitudinal axis, the labeling region 106 may also be oriented perpendicular to the longitudinal axis. In yet other variations, if the labels 104 are oriented at a specific angle relative to the longitudinal axis aa, the labeling region 106 may be oriented at that angle relative to the longitudinal axis aa.

The cover 108 may have any suitable shape for surrounding at least a portion of the container 102. For example, the cover 108 may include a cross-sectional shape that may surround at least a portion of the circumference and/or perimeter (e.g., one-tenth, one-eighth, one-sixth, one-fourth, half, three-fourths, and/or the like) of an outer surface of the container 102. In some variations, the cover 108 may include a cross-sectional shape that may surround the entire circumference and/or perimeter of an outer surface of the container 102. The cross-section of the cover 108 may be at least a portion of any suitable shape such as circular, elliptical, polygonal (e.g., triangular, rectangular, etc.), and/or the like. Similar to the container 102 described above, in some variations, the cover 108 may have a radially-symmetrical cross-section or other suitable symmetrical cross-section (e.g., bilateral symmetry, tri-lateral symmetry, quadrilateral symmetry, other symmetry along any suitable number of axes such as 5, 6, 7, 8 or more, etc.). Furthermore, the cover 108 may have a cross-section that varies along a longitudinal axis (e.g., tapered, such as cone-shaped or pyramidal-shaped, or portion thereof such as frustoconical shape). In some variations, the cover 108 may at least partially surround a bottom portion of the container 102 (e.g., the cover 108 may be a sleeve with one open end and one closed bottom end). Alternatively, the cover 108 may not surround the bottom portion of the container 102 (e.g., the cover 108 may be a sleeve having two open ends).

In some variations, the height of the cover 108 may be lower than the height of the container 102. For example, the height of the cover 108 may be any suitable fraction of the height of the container 102 (e.g., one-eighth the height of the container 102, one-sixth the height of the container 102, one-fourth the height of the container 102, half the height of the container 102, etc.). The thickness of the cover 108 may be any suitable thickness. For instance, the thickness of the cover 108 may depend on the thickness of the container 102. Additionally, or alternatively, the thickness of the cover 108 may depend on factors such as anticipated use of the container 102, anticipated terrain in which the container 102 may be used, the type of contents to be stored in the container 102, a combination thereof, and/or the like. For example, if the anticipated use of the container 102 is rough usage, such as using the container 102 during intense outdoor activities and/or in rough terrains, the thickness of the cover 108 may be relatively high. In contrast, if the anticipated use of the container 102 is solely for storing contents, such as for storing cleaning solutions, the thickness of the cover 108 may be relatively low. In a similar manner, if the anticipated use of the container 102 is to store extremely hot or extremely cold content, the thickness of the cover 108 may be relatively high to allow for good thermal insulation.

Cover 108 may help protect the container 102 from damage. For instance, the cover 108 may protect the container 102 from breakage (e.g., when the container falls from a height). Additionally, or alternatively, cover 108 may protect at least a portion of the container 102 from environmental pollutants (e.g., dust, soot, allergens, etc.). In some variations, cover 108 may provide heat insulation. For instance, cover 108 may insulate a user's hand from the temperature of the content (e.g., hot content or cold content) in the container 102. In some variations, cover 108 may enable a user to firmly grip the outer surface of the container 102. For example, the cover 108 may include a frictional material, textural features (e.g., bumps, ridges, recesses, finger grips, etc.).

Cover 108 may comprise any suitable material. For example, cover 108 may comprise synthetic rubbers such as neoprene, polymers such as silicone, synthetic polymers such as nylon, cotton, a combination thereof, and/or the like. In some variations, cover 108 may include a relatively high frictional material (e.g., silicone) to improve engagement with the container 102 and/or facilitate grip or handling of the container. In some variations, cover 108 may be a silicone sleeve that may at least partially surround the container 102. The inner diameter of the cover 108 may be sized based on the diameter of the container 102. For example, the inner diameter of the cover 108 may be sized so as to fit the outer surface of the container 102 in a snug manner. Additionally, or alternatively, the inner diameter of the cover 108 may be sized so as to fit some but not all portions of the outer surface of the container 102 in a snug manner. For instance, the inner diameter of the cover 108 may be sized to fit the broadest portion of the container 102. In such variations, the fit of the cover 108 around a relatively narrow portion of the container 102 may be substantially loose.

Figure 2:
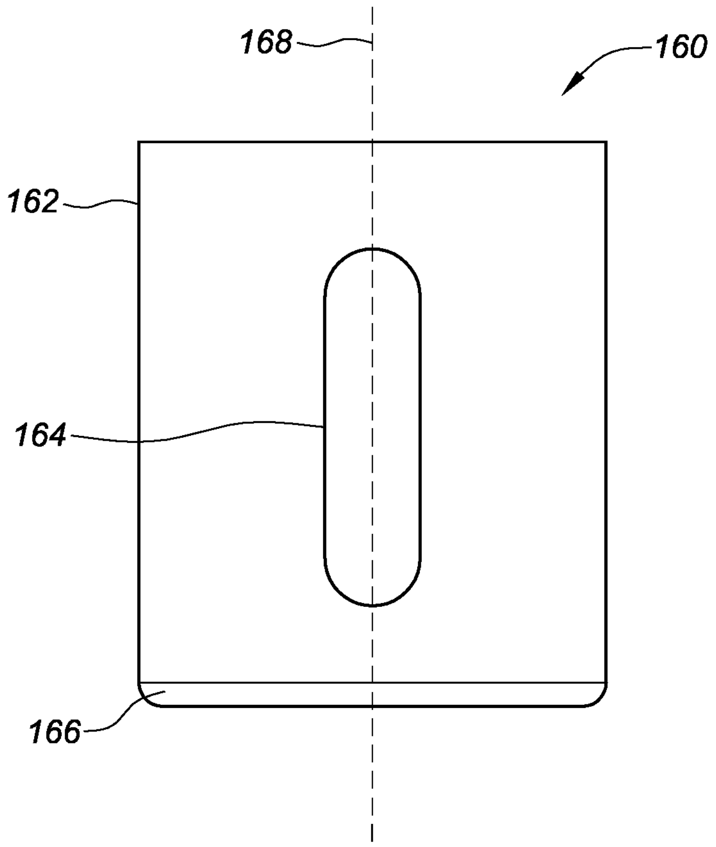
FIG. 2 illustrates an exemplary variation of a cover enabling container content identification, in accordance with embodiments of the present disclosure.

FIG. 2 illustrates an exemplary variation of a cover 160 (e.g., similar or the same as cover 108 in FIG. 1A) enabling container content identification, in accordance with embodiments of the present disclosure. The cover 160 includes a top portion 162. In some variations, the cover 160 may also include a bottom portion 166. The cover 160 may be attached to an outer surface of a container (e.g., container 102 in FIG. 1A). The cover 160 may be attached by inserting the container from the top portion 162 of the cover 160. In some variations, the cover 160 may be inserted such that a bottom portion of the container may touch and/or contact a bottom portion 166 of the cover 160. Alternatively, the container may be inserted from the top portion 162 of the cover 160 such that the bottom portion of the container extends out of the bottom portion 166 of the cover 160. In some variations, the bottom portion 166 of the cover 160 may include a cutout/hole as further described below. In some variations, the cutout/hole may enable attaching and/or detaching the cover 160 from the container more easily as described below.

The cover 160 also includes a labeling region 164 that may be selectively positionable to expose a label disposed on the labeling ring (e.g., labeling ring 120 in FIG. 1B). For example, the labeling region 164 may function as a window through which the exposed label on the labeling ring may be visible.

In some variations, the labeling region 164 may be a negative space on the cover 160. For example, the cover 160 may be designed so as to include the negative space (e.g., an empty space, empty arc, etc.), thereby forming the labeling region 164. The negative space may be integrated with the cover 160 during fabrication of the cover 160. Alternatively, the negative space may be created on the cover 160 by carving/cutting/slitting a portion of the cover 160 after the cover 160 has been fabricated.

In some variations, the labeling region 164 may be a gap on the cover 160 that at least partially surrounds the container 102. For instance, a cover having a C-shaped cross-section may be designed to include a longitudinal gap that functions as the labeling region 164. The gap may be included in the cover 160 during the fabrication of the cover 160 (e.g., by injection molding, by molding a sheet of material into a curve, etc.). Alternatively, the gap may be created on the cover 160 after the cover has been fabricated (e.g., by cutting away a longitudinal strip of material to form a longitudinal gap in the cover).

In some variations, the labeling region 164 may comprise a transparent material. For example, cover 160 may be fabricated such that a portion of the cover 160 may be formed using a transparent material (e.g., transparent plastic film, clear glass, epoxy resin, etc.) while the rest of the cover 160 may be fabricated from one or more suitable materials such as neoprene, silicone, nylon, cotton, and/or the like. In some variations, the labeling region 164 comprising the transparent material may be integrated with the cover 160 during the fabrication of the cover 160 (e.g., by using an appropriate mold). Alternatively, after the cover 160 has been fabricated, at least one portion of the cover 160 may be carved, cut, and/or slit out. Transparent material may then be disposed, attached, and/or affixed on the carved/cut/slit portion of the cover 160.

In some variations, the labeling region 164 may include one or more polarizing filters to manage polarized light reflected from/absorbed on the surface of the container (e.g., container 102 in FIG. 1). The polarizing filters may be mounted on, disposed on, attached to, and/or affixed to the cover 160 after the cover 160 has been fabricated. Alternatively, the polarizing filters may be integrated with the cover 160 during the fabrication of the cover 160. In some variations, the labeling region 164 may include one or more color filters. The color filters may be mounted on, disposed on, attached to, and/or affixed to the cover 160 after the cover has been fabricated. Alternatively, the color filters may be integrated with the cover 160 during the fabrication of the cover 160. In some variations, the labeling region 164 may have a different color than that of the cover 160.

Although FIG. 2 depicts the labeling region 164 as having an elongated region with curved or rounded (semi-circular) ends, it should be readily understood that the labeling region 164 can have any suitable shape. For example, the labeling region 164 may be wavy, and/or at least a portion of the labeling region 164 may be triangular shaped, circular shaped, diamond shaped, pyramid shaped, etc. Furthermore, although FIG. 2 illustrates a single labeling region 164 on the cover 160, it should be readily understood that in other variations, two or more labeling regions may be included on the cover 160.

The labeling region 164 may have any suitable orientation relative to the longitudinal axis 168. For example, the labeling region 164 may be along the longitudinal axis 168 as seen in FIG. 2. In such a variation, a container (e.g., container 102 in FIG. 1) may include labels along and/or parallel to the longitudinal axis 168 (e.g., such as labels 104 in FIG. 1B). The labeling region 164 may be selectively positionable so as to expose a label. For example, the cover 160 may be rotated along the longitudinal axis 168 until a label of choice is exposed via the labeling region 164. As an example, referring back to FIG. 1B, the container 102 may include the label 104-1. Label 104 may be oriented along and/or parallel to a longitudinal axis (not shown in FIG. 1B). As discussed herein, in some embodiments, the labeling ring 120, as depicted in FIG. 1B, can be rotated about the longitudinal axis aa, such that a particular label 104-1 is aligned with the alignment indicators 124-1, 124-2. The cover 108 can then be placed over bottom of the container 102 and the labeling ring 120, such that the label 104-1 is displayed in the labeling region 106. To select a different label, the cover 108 can be removed and the labeling ring 120 can be rotated to align a different label with the alignment indicators 124-1, 124-2 and thus the labeling region 106, when the cover is inserted on to the bottom of the container. In some embodiments, the cover 108 may be rotated (e.g., about the longitudinal axis) such that the labeling region 164 exposes a label 104 disposed on the labeling ring. As described above, the labeling region 164 may be a negative space that exposes the label 104 on the container 102. Alternatively, the labeling region 164 may comprise one or more transparent materials that exposes the label 104 on the container 102. In this example, similar to FIG. 2, the labeling region 164 in FIG. 1A may be oriented along a longitudinal axis.

Figure 3A:
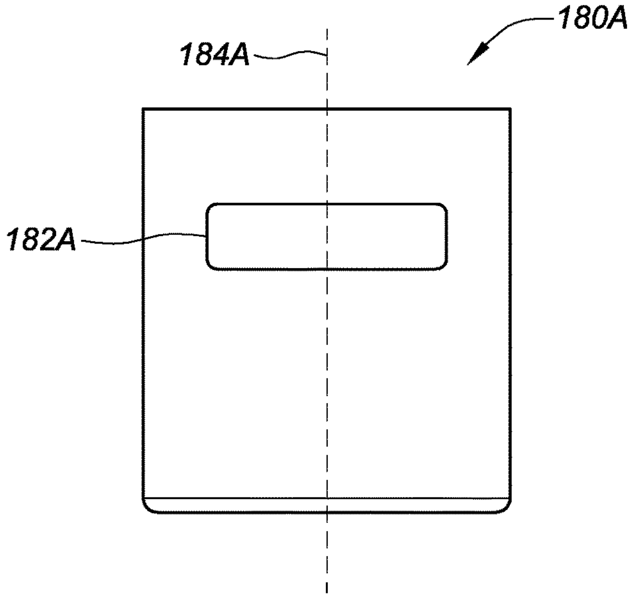
FIG. 3A illustrates an exemplary variation of a cover including a labeling region perpendicular to a longitudinal axis of the cover, in accordance with embodiments of the present disclosure.
Figure 3B:
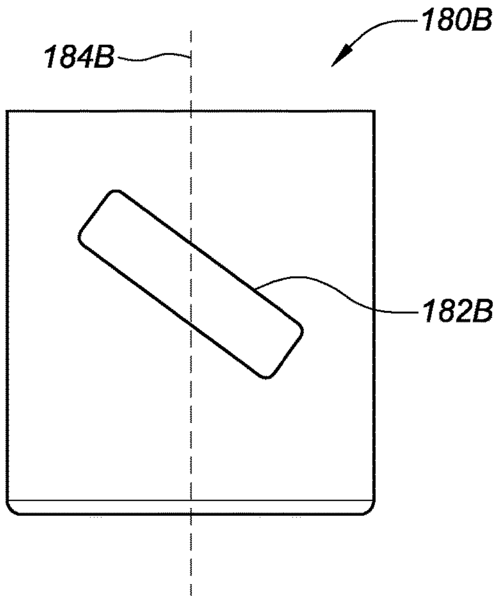
FIG. 3B illustrates an exemplary variation of a cover including a labeling region angled relative to a longitudinal axis of the cover, in accordance with embodiments of the present disclosure.
Figure 3C:
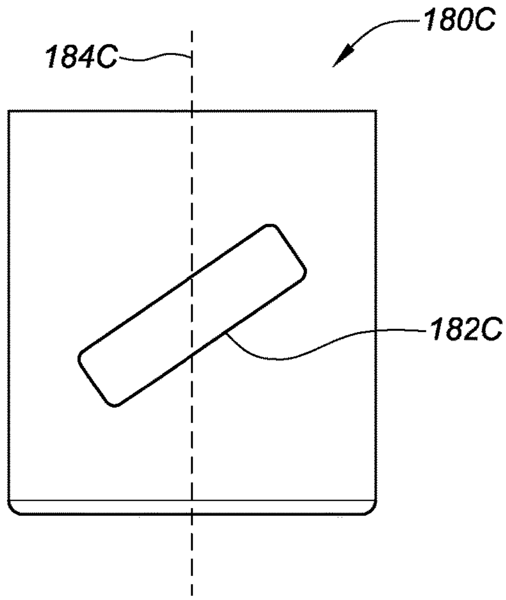
FIG. 3C illustrates an exemplary variation of a cover including a labeling region angled relative to a longitudinal axis of the cover, in accordance with embodiments of the present disclosure.

As mentioned above, the labeling region 164 may have any suitable orientation relative to the longitudinal axis (e.g., 20 degrees, 30 degrees, 45 degrees, 60 degrees, 75 degrees, 105 degrees, 135 degrees, etc.). FIGS. 3A-3C illustrate exemplary variations of covers 180A, 180B, and 180C with labeling regions having different orientations relative to the longitudinal axis of the cover. In FIG. 3A, the labeling region 182A is perpendicular to the longitudinal axis 184A. In such a variation, a container (e.g., container 102 in FIG. 1A) may include labels perpendicular to the longitudinal axis 184A. In variations in which all of the labels are perpendicular to the longitudinal axis 184A and at the same height or longitudinal position along the longitudinal axis 184A, the cover 180A may be rotatable around the longitudinal axis to selectively expose the labels. In some embodiments, as mentioned, the cover 180A can be removed from the container 102 and the labeling ring can be rotated to select a particular label. The cover 180A can then be replaced over the container 102 and a labeling region 182A can be aligned with a particular one of the labels.

In some embodiments, by placing the labels on the labeling ring 120, a step of printing, etching, or otherwise forming labels on the container 102 can be avoided. Thus, the labeling ring 120 can be less costly to produce than printing or etching labels on the container. Furthermore, in some embodiments, additional labeling rings with different labels can be used with the container 102. For example, in some embodiments, a labeling ring 120 can be included with the purchase of the system, as described in FIG. 1A. In some embodiments, additional labeling rings can be sold separately, which can replace the included labeling ring 120 sold with the system 100. In some embodiments, individual components of the system 100 can be sold. For example, the labeling ring 120 can be sold separately from the container 102, which can be sold separately from the cover 108. In some embodiments, different colors for the cover, label, and/or nozzle can be used with one another.

In some embodiments, the labels disposed on the labeling ring 120 can be disposed at different heights along the longitudinal axis 184A. In an example, the labeling ring 120 can slide vertically along the longitudinal axis 184A, such that a particular one of the labels is displayed in the labeling region 182A. Accordingly, as the labeling ring slides along the longitudinal axis 184A, the labeling region 182A may expose one or more labels that may be oriented perpendicular to the longitudinal axis 184A on the labeling ring 120.

In FIGS. 3B and 3C, the labeling region 182B and 182C may be oriented at an angle (e.g., 135 degrees and 45 degrees) relative to the longitudinal axis 184B and 184C. In such variations, a labeling ring (e.g., labeling ring 120 in FIG. 1B) may include labels having a similar orientation (e.g., 135 degrees and 45 degrees) relative to the longitudinal axis 184B and 184C. At least some of the angled labels may also be at different heights or longitudinal positions along the longitudinal axis 184B and 184C. Accordingly, a labeling ring 120 may be rotatable and/or slidable such that the labeling ring 120 can be movable to cause one or more labels on the labeling ring 120 to be displayed within the labeling regions 182B and 182C. For example, the labeling ring 120 may be rotated along the longitudinal axis 184B, 184C. Additionally, or alternatively, the labeling ring 120 may be slidable relative to the longitudinal axis 184B/184C. The movement of the labeling ring 120 can cause one or more labels to be exposed in the labeling region 182B/182C.

In some variations, the labeling region may expose a single label on the container while the remaining portion of the cover may cover the rest of the labels on the container. Alternatively, the labeling region may highlight or otherwise emphasize a single label (e.g., via polarizing filters, color filters, etc.) while at least some of the rest of the labels (non-highlighted labels) may still be exposed on the container but not emphasized in the same manner as the highlighted label. In some variations, multiple labels located at multiple positions on the labeling ring may represent the same container content type, and the cover may include more than one labeling region to expose these multiple labels simultaneously. For example, a first label indicating a container content type may be on a right side of the labeling ring, and a second label indicating the same container content type may be on a left side of the labeling ring. In this example, the cover may include a first labeling region and a second labeling region, where the labeling ring content type may be visible through both the first labeling region positionable on the right side of the container, and through the second labeling region positionable on the left side of the container. However, a container content type may be repeated any suitable number of times, and the labeling ring may include any suitable corresponding number of labeling regions.

In some variations, if the cover does not include a relatively high frictional material (e.g., silicone) to improve engagement with the container and the labeling ring, other suitable methods may be used to engage the cover with the labeling ring. For instance, a combination of at least a portion of the cover and at least a portion of the labeling ring may together include a latch mechanism. For example, an outer surface of the labeling ring may include one or more recesses and/or dents. An inner surface of the cover may include one or more bumps and/or protrusions. When the cover is rotated, the bumps and/or protrusions on the inner surface of the cover may engage with the recesses and/or dents on the labeling ring (e.g., detents). The engagement of the protrusions with the dents may latch the cover to the container labeling ring. Additionally, or alternatively, an outer surface of the labeling ring may include one or more bumps and/or protrusions. The inner surface of the cover may include one or more recesses and/or dents. The engagement of the protrusions on the labeling ring with the dents on the cover may latch the cover to the container. For example, in some embodiments, the labeling ring 120 can include raised areas, as depicted and discussed in FIG. 1E, which are configured to engage with the labeling region 106.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it may be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for a system for container content identification has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and may include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure may be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. An apparatus comprising:

a container that includes a circumferentially extending groove, the container defining a longitudinal axis;

a labeling ring, wherein the labeling ring is configured to be inserted into the circumferentially extending groove and includes a plurality of labels disposed on an exterior surface of the labeling ring, and wherein the labeling ring is configured to circumferentially rotate about the longitudinal axis, within the circumferentially extending groove; and a cover disposed about a portion of the container including the circumferentially extending groove and the labeling ring, wherein the cover defines an opening through which one of the labels is exposed.

2. The apparatus of claim 1, wherein the container includes an alignment indicator configured to indicate a particular one of the labels to be displayed through an opening.

3. The apparatus of claim 1, wherein the labeling ring includes a plurality of raised areas on which the labels are disposed.

4. The apparatus of claim 3, wherein the opening defined by the cover is configured to accept a selected one of the raised areas on which the labels are disposed, thereby displaying the label on the selected one of the raised areas.

5. The apparatus of claim 1, wherein an inner diameter of the labeling ring is less than an outer diameter of the container.

6. The apparatus of claim 1, wherein the labeling ring is formed from an elastic material.

7. The apparatus of claim 6, wherein the cover is formed from an elastic material.

8. A container, comprising:

a longitudinal axis about which a wall extends;

a groove formed in an exterior face of the wall; and an alignment indicator formed on the exterior face of the wall, adjacent to the groove, wherein the alignment indicator is configured to indicate a particular one of the labels to be displayed through the opening.

9. The container of claim 8, wherein the groove is defined by:

a pair of walls that extend inward, towards the longitudinal axis, from the exterior face of the wall; and a base wall that extends between the pair of walls, parallel with the longitudinal axis.

10. The container of claim 8, further comprising a labeling ring configured to be disposed in the groove.

11. The container of claim 10, wherein the labeling ring includes a plurality of labels disposed on an exterior surface of the labeling ring.

12. The container of claim 11, wherein the labeling ring is configured to rotate about the longitudinal axis, in the groove.

13. The container of claim 8, wherein the alignment indicator is configured to indicate a particular one of the labels to be displayed through the opening.

14. An apparatus comprising:

a container that includes a circumferentially extending groove, the container defining a longitudinal axis;

a labeling ring, wherein the labeling ring is configured to be inserted into the circumferentially extending groove and includes a plurality of labels disposed on an exterior surface of the labeling ring, and wherein the labeling ring is configured to circumferentially rotate about the longitudinal axis, within the circumferentially extending groove; and a cover disposed about a portion of the container including the circumferentially extending groove and the labeling ring, wherein the container includes an alignment indicator configured to indicate a particular one of the labels to be displayed through the opening.

* * * * *